United States Patent
Kuczynski et al.

(10) Patent No.: US 10,169,499 B2
(45) Date of Patent: Jan. 1, 2019

(54) THERMOSET RESIN FLOW MODELS FOR PRINTED CIRCUIT BOARD LAMINATES

(71) Applicant: International Business Machines Corporation, Armonk, NY (US)

(72) Inventors: Joseph Kuczynski, North Port, FL (US); Arvind K. Sinha, Los Alamos, NM (US); Kevin A. Splittstoesser, Stewartville, MN (US); Timothy J. Tofil, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 632 days.

(21) Appl. No.: 14/798,818

(22) Filed: Jul. 14, 2015

(65) Prior Publication Data

US 2017/0017733 A1 Jan. 19, 2017

(51) Int. Cl.
G06G 7/48 (2006.01)
G06G 7/50 (2006.01)
G06F 17/50 (2006.01)

(52) U.S. Cl.
CPC ...... *G06F 17/5018* (2013.01); *G06F 17/5068* (2013.01)

(58) Field of Classification Search
None
See application file for complete search history.

(56) References Cited

U.S. PATENT DOCUMENTS

| | | | |
|---|---|---|---|
| 4,989,166 A * | 1/1991 | Akasaka | B29C 33/3835 700/197 |
| 5,131,265 A * | 7/1992 | Tobin | B29C 45/7646 73/54.01 |
| 5,164,128 A * | 11/1992 | Modrek | B29C 64/135 118/423 |
| 5,906,682 A | 5/1999 | Bouras et al. | |
| 6,756,251 B2 | 6/2004 | Lee | |
| 7,338,842 B2 | 3/2008 | Chaware et al. | |

(Continued)

FOREIGN PATENT DOCUMENTS

JP 2003289088 10/2003

OTHER PUBLICATIONS

Jiang, et al., "Solvent-Free Synthesis of Janus Colloidal Particles", American Chemical Society, Langmuir 2008, vol. 24, pp. 10073-10077.

(Continued)

*Primary Examiner* — Cedric Johnson
(74) *Attorney, Agent, or Firm* — Patterson + Sheridan, LLP

(57) ABSTRACT

In an example, a method includes storing thermoset resin rheology data associated with a thermoset resin at a memory. The thermoset resin rheology data includes a plurality of sets of dynamic fluid flow properties that are measured for the thermoset resin. The method includes receiving, at a computing device, information associated with a printed circuit board (PCB) laminate design. The method also includes receiving, at the computing device, a first set of PCB lamination parameters. The method further includes storing, at the computing device, a first thermoset resin flow model. The first thermoset resin flow model is generated based on the thermoset resin rheology data, the information associated with the PCB laminate design, and the first set of PCB lamination parameters.

19 Claims, 4 Drawing Sheets

(56) References Cited

U.S. PATENT DOCUMENTS

| 8,008,122 B1 | 8/2011 | Gaynes et al. |
| 8,110,438 B2 | 2/2012 | Gupta et al. |
| 2005/0161846 A1 | 7/2005 | Quinones et al. |
| 2014/0285979 A1* | 9/2014 | Chamberlin ......... H05K 3/4611 361/748 |

OTHER PUBLICATIONS

Perro, et al., "Production of Large Quantities of "Janus" nanoparticles Using Wax-in-Water Emulsions", Colloids and Surfaces A: Physicochemical and Engineering Aspects, 2009, pp. 57-62.

\* cited by examiner

US 10,169,499 B2

THERMOSET RESIN FLOW MODELS FOR PRINTED CIRCUIT BOARD LAMINATES

I. FIELD OF THE DISCLOSURE

The present disclosure relates generally to thermoset resin flow models for printed circuit board laminates.

II. BACKGROUND

A thermoset material (e.g., a resin in a soft solid or viscous state) changes irreversibly into an infusible, insoluble polymer network by curing. In contrast to a thermoplastic resin that has a constant viscosity at a particular temperature, a thermoset resin has a viscosity that varies as a function of temperature and reaction state (e.g., a degree of resin crosslinking) To illustrate, as a thermoset resin cures, the viscosity may initially decrease (provided that the curing is done at an elevated temperature) and then begin to rapidly increase as the thermoset resin begins to gel.

A printed circuit board (PCB) laminate design may include a multiple-layer "stack-up" design that includes multiple layers. For example, a PCB may be formed of a fiberglass cloth pre-impregnated with a thermoset resin, also referred to as a "prepreg" material. Due to the complex nature of fluid flow properties for thermoset resins, design of PCB lamination processes that use thermoset resins can be challenging.

III. SUMMARY OF THE DISCLOSURE

According to an embodiment, a method is disclosed that includes storing thermoset resin rheology data associated with a thermoset resin at a memory. The thermoset resin rheology data includes a plurality of sets of dynamic fluid flow properties that are measured for the thermoset resin. The method includes receiving, at a computing device, information associated with a printed circuit board (PCB) laminate design. The method also includes receiving, at the computing device, a first set of PCB lamination parameters. The method further includes storing, at the computing device, a first thermoset resin flow model. The first thermoset resin flow model is generated based on the thermoset resin rheology data, the information associated with the PCB laminate design, and the first set of PCB lamination parameters.

According to another embodiment, a computer-readable storage device is disclosed. The computer-readable storage device includes instructions that are executable by a process to perform various operations. The operations include receiving information associated with a PCB laminate design that includes multiple layers associated with a thermoset resin. The operations include receiving a first set of PCB lamination parameters. The operations also include retrieving first stored thermoset resin rheology data including a first set of dynamic fluid flow properties for the thermoset resin. The operations further include generating a first thermoset resin flow model based on the first set of dynamic fluid flow properties for the thermoset resin, the information associated with the PCB laminate design, and the first set of PCB lamination parameters.

According to another embodiment, a system is disclosed that includes a processor and a memory in communication with the processor. The memory includes instructions that are executable by the processor to perform various operations. The operations include receiving information associated with a PCB laminate design that includes multiple layers associated with a thermoset resin. The operations include receiving a set of PCB lamination parameters. The operations also include retrieving first stored thermoset resin rheology data including a set of dynamic fluid flow properties for the thermoset resin. The operations further include generating a thermoset resin flow model based on the set of dynamic fluid flow properties for the thermoset resin, the information associated with the PCB laminate design, and the set of PCB lamination parameters.

One advantage of the present disclosure is improved design of PCB lamination processes. For example, using dynamic fluid flow properties of the thermoset resin to plan and model a PCB lamination process may reduce a likelihood of resin starvation at one or more regions (e.g., circuitry dense regions) of a laminated printed circuit board. Thermoset resin rheology data, including dynamic viscosity values for a thermoset resin measured at various temperatures over time, may be determined based on rheological experiments. One or more PCB lamination parameters (or PCB laminate design, such as resin content of a prepreg material) may be modified based on the model in order to improve the PCB lamination process.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

IV. BRIEF DESCRIPTION OF THE DRAWINGS

V. DETAILED DESCRIPTION

In the present disclosure, rheology experiments may provide information regarding dynamic fluid flow properties for a thermoset resin for various process conditions (referred to herein as "thermoset resin rheology data"). To illustrate, the dynamic fluid flow properties may include dynamic viscosity values as a function of temperature and time/reaction state for multiple sets of process conditions. The thermoset resin rheology data may be stored and subsequently utilized as an input to simulation logic (e.g., software and/or hardware) in order to model the thermoset resin flow. By accounting for the temperature-dependent change in viscosity over time, the simulation logic may model thermoset resin flow in a PCB lamination process. The ability to model thermoset resin flow for a particular PCB design may allow parameter(s) of the PCB lamination process (or prepreg resin content) to be adjusted to provide adequate wetting of the surfaces by the thermoset resin in order to reduce a likelihood of failures, such as glistening filaments and/or cathodic anodic filaments and to reduce instances of resin starvation.

In the present disclosure, stored thermoset resin rheology data, information associated with a PCB laminate design, and a set of PCB lamination parameters is used to generate a thermoset resin flow model. The thermoset resin flow model may be utilized to determine whether a PCB lamination process based on the set of PCB lamination parameters is expected to result in adequate resin wetting. To illustrate, the information associated with the PCB laminate design may include geometrical information describing lines, spaces and/or devices of a circuitized panel of the PCB. The thermoset resin flow model may be utilized to model a depth of resin flow at various points in order to determine whether a PCB lamination process is expected to result in resin starvation (e.g., at one or more circuitry-dense regions) or excess resin (e.g., resin thickness greater than a threshold resin flow beyond edges of the PCB).

When the thermoset resin flow model predicts that inadequate resin wetting is expected, one or more of the PCB lamination parameters (or prepreg resin content) may be modified in order to increase resin flow to resin-starved region(s) or to decrease resin flow in area(s) with excess resin. Based on the stored thermoset resin rheology data, a modified thermoset resin flow model may be generated for the modified set of PCB lamination parameters. The modified thermoset resin flow model may be utilized to determine whether adequate resin wetting is expected to occur for a PCB lamination process that is based on the modified set of PCB lamination parameters. The PCB lamination parameters may be (iteratively) adjusted until the thermoset resin flow model predicts that adequate resin wetting is expected.

Figure 1:
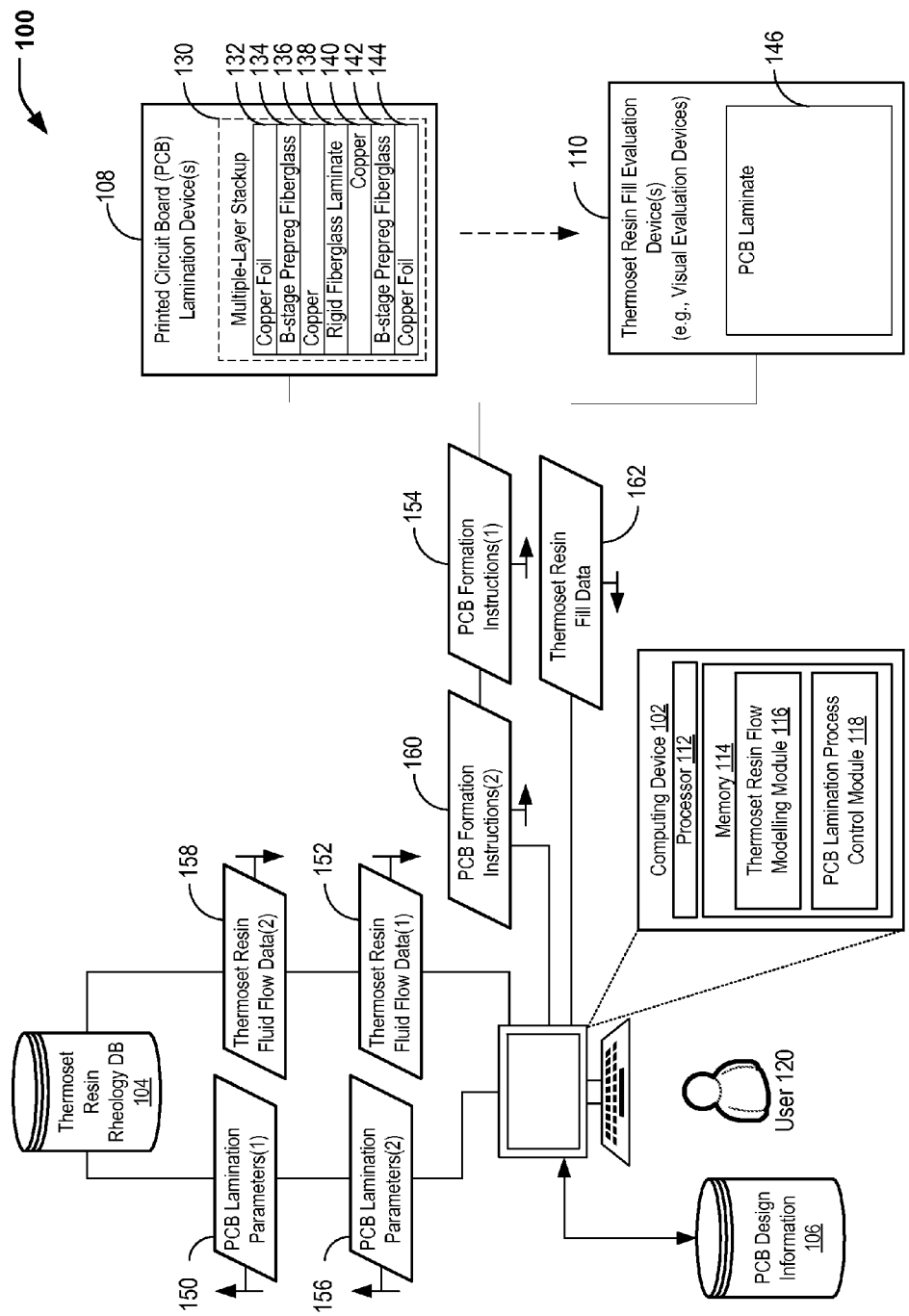
FIG. 1 is a block diagram showing a system for generating and utilizing a thermoset resin flow model, according to one embodiment.

FIG. 1 illustrates a particular embodiment of a system 100 for generating and utilizing a thermoset resin flow model. Thermoset resin rheology data may be obtained for one or more thermoset resins (e.g., with different resin contents) based on multiple rheological experiments. For a particular PCB laminate design and a particular set of PCB lamination parameters, a thermoset resin flow model may be generated in order to determine whether adequate resin wetting is expected for a PCB lamination process. FIG. 1 further illustrates that, when evaluation (e.g., visual inspection) of a printed circuit board that is formed according to a particular set of PCB lamination parameters identifies one or more resin-starved regions, information related to the resin-starved region(s) may be used to modify one or more PCB lamination parameters and/or a PCB laminate design (e.g., a resin content of a prepreg material).

In the example of FIG. 1, the system 100 includes a computing device 102, thermoset resin rheology data 104 stored at a memory (e.g., a thermoset resin rheology database), and PCB design information 106 (e.g., a computer-aided design file that includes a 3-dimensional model of meshes/layers/design features of a PCB laminate design). The thermoset resin rheology data 104 includes a plurality of dynamic fluid flow properties that are measured for a thermoset resin (or multiple thermoset resins). The thermoset resin rheology data 104 includes information descriptive of fluid flow properties of a thermoset as a function of reaction time and reaction temperature. While FIG. 1 shows the computing device 102 as separate from the thermoset resin rheology data 104 and the PCB design information 106, it will be appreciated that this is for illustrative purposes only. The thermoset resin rheology data 104 and the PCB design information 106 may be stored at the computing device 102 or otherwise accessible to the computing device 102 (e.g., via a network). In the particular embodiment illustrated in FIG. 1, the system 100 further includes a PCB lamination device 108 (or multiple PCB lamination devices) and a thermoset resin fill evaluation device 110 (or multiple thermoset resin fill evaluation devices), such as a visual evaluation device to determine resin fill adequacy.

The computing device 102 includes a processor 112 and a memory 114 in communication with the processor 112. In the particular embodiment illustrated in FIG. 1, the memory 114 includes a thermoset resin flow modelling module 116 and a PCB lamination process control module 118. FIG. 1 further illustrates that, in some cases, a user 120 may interact with the computing device 102 (e.g., to input rheological data, PCB design information, PCB lamination parameters, etc.). The computing device 102 is configured to receive information associated with a PCB laminate design, to receive a set of PCB lamination parameters, and to retrieve stored thermoset resin rheology data including a set of dynamic fluid flow properties for the thermoset resin (or multiple resins). The computing device 102 is configured to generate a thermoset resin flow model based on the set of dynamic fluid flow properties for the thermoset resin, the information associated with the PCB laminate design, and the set of PCB lamination parameters. For example, the computing device 102 may utilize the thermoset resin flow modelling module 116 to generate the thermoset resin flow model. The thermoset resin flow model may correspond to time, temperature, finite elements, flow, and pressure, among other lamination process parameters.

The PCB laminate design may describe multiple layers associated with a thermoset resin (e.g., a B-stage prepreg fiberglass material, among other alternatives). In the example of FIG. 1, the PCB laminate design corresponds to a multiple-layer stackup 130 (illustrated in cross-section in FIG. 1), and the computing device 102 may be configured to access the PCB design information 106 to retrieve information associated with the multiple-layer stackup 130. In the illustrative example of FIG. 1, the multiple-layer stackup 130 includes a first layer 132 (e.g., copper foil), a second layer 134 (e.g., B-stage prepreg fiberglass), a third layer 136 (e.g., copper), a fourth layer 138 (e.g., rigid fiberglass), a fifth layer 140 (e.g., copper), a sixth layer 142 (e.g., B-stage prepreg fiberglass), and a seventh layer 144 (e.g., copper foil). It will be appreciated that the example cross-sectional view of the multiple-layer stackup 130 in FIG. 1 is for illustrative purposes only, and the PCB laminate design may include an alternative number of layers (e.g., forty or more layers, in some cases). The PCB lamination device 108 is configured to perform one or more operations associated with forming a printed circuit board (e.g., a PCB laminate 146) according to a particular set of PCB lamination parameters.

In a particular embodiment, the first set of PCB lamination parameters 150 is associated with a PCB lamination process that includes a plurality of process stages. A first process stage corresponds to a first set of process conditions, and a second process stage corresponds to a second set of process conditions that is different from the first set of process conditions. In this example, the stored thermoset resin rheology data 104 includes at least a first set of dynamic fluid flow properties for the thermoset resin. The first set of dynamic fluid flow properties are determined by monitoring fluid flow properties of the thermoset resin during application of the first set of process conditions during a first time period and the second set of process conditions during a second time period. To illustrate, the first set of dynamic fluid flow properties may include dynamic viscosity values for the thermoset resin as a function of temperature and reaction state (e.g., a degree of cross-linking over time), and the dynamic viscosity values may be measured for the thermoset resin during the first time period and the second time period. In some cases, the first set of process conditions includes a first temperature and a first pressure, and the second set of process conditions includes a second temperature and a second pressure. The first temperature may be different from the second temperature and/or the second pressure may be different from the second pressure. Further, a rate of temperature change (also referred to as a "temperature ramp rate") may be associated with a transition from the first temperature to the second temperature. For example, thermoset cross-linking may be an exothermic reaction. Thus, a temperature of the thermoset may change as reactions state changes. It will be appreciated that the PCB lamination process may include multiple temperature changes, multiple pressure changes, multiple temperature ramp rates, or a combination thereof.

In operation, the computing device 102 may receive information associated with a PCB laminate design. The PCB laminate design includes detailed geometry of each layer (or circuit layer). For example, the computing device 102 may retrieve information associated with the multiple-layer stackup 130 from the PCB design information 106. The computing device 102 may receive the first set of PCB lamination parameters 150. In a particular embodiment, the user 120 may input the first set of PCB lamination parameters 150 (e.g., based on an estimate of process conditions to effect adequate resin flow for one or more prepreg thermoset materials of the multiple-layer stackup 130, such as the layers 134 and 142 shown in the example of FIG. 1). In a particular embodiment, manufacturer guidelines for processing of a particular prepreg material (e.g., maximum pressure, maximum temperature ramp rate, maximum temperature) may be adequate in cases of multiple-layer stackup designs with a relatively small number of layers (e.g., 20 layers). However, there may be significant deviation from the guidelines when laminating stack-up designs with a relatively large number of layers (e.g., 40 or more layers). The thermoset resin flow modelling module 116 may retrieve first thermoset resin fluid flow data 152 (e.g., a first set of dynamic fluid flow properties, such as dynamic viscosity values) from the stored rheology data 104 that corresponds to the first set of PCB lamination parameters 150.

The thermoset resin flow modelling module 116 may generate a first thermoset resin flow model based on the first thermoset resin fluid flow data 152, the information associated with the multiple-layer stackup 130, and the first set of PCB lamination parameters 150. The thermoset resin flow modelling module 116 may determine, based on the first thermoset resin flow model, whether a first PCB lamination process that is based on the first set of PCB lamination parameters 150 is expected to result in resin starvation or an excess amount of resin. To illustrate, the thermoset resin flow modelling module 116 may utilize a finite elements model (or other model) based on geometry, dynamic viscosity, temperature settings of a lamination press, pressure settings of the lamination press, cross-linking agents, among other alternatives.

When the thermoset resin flow modelling module 116 determines, based on the first thermoset resin flow model, that the first PCB lamination process is expected to result in adequate resin wetting (e.g., neither underflow or overflow), the first set of PCB lamination parameters 150 may be stored (e.g., at the memory 114). In the particular embodiment illustrated in FIG. 1, the PCB lamination process control module 118 may send first instructions 154 to the PCB lamination device 108. The first instructions 154 may include the first set of PCB lamination parameters 150, and the PCB lamination device 108 may perform one or more operations associated with forming the PCB laminate 146 according to the first set of PCB lamination parameters 150.

When the thermoset resin modelling module 116 determines, based on the first thermoset resin flow model, that the first PCB lamination process is expected to result in inadequate resin wetting (e.g., starvation, underflow, or excess thickness), at least one parameter of the first set of PCB lamination parameters 150 may be modified to generate a second set of PCB lamination parameters 156. For example, the second set of PCB lamination parameters 156 may include modified temperature(s), modified pressure(s), modified rate(s) of temperature change, or a combination thereof. In some cases, the thermoset resin flow modelling module 116 may automatically determine one or more parameters to be modified. Alternatively, the user 120 may select one or more parameters to be modified.

The thermoset resin flow modelling module 116 may retrieve second thermoset resin fluid flow data 158 (e.g., a second set of dynamic fluid flow properties, such as dynamic viscosity values) from the stored thermoset resin rheology data 104 that corresponds to the second set of PCB lamination parameters 156. The thermoset resin flow modelling module 116 may generate a second thermoset resin flow model based on the second thermoset resin fluid flow data 158, the information associated with the PCB laminate design (e.g., the multiple-layer stackup 130), and the second set of PCB lamination parameters 156. The thermoset resin flow modelling module 116 may determine, based on the second thermoset resin flow model, whether a second PCB lamination process that is based on the second set of PCB lamination parameters 156 is expected to result in adequate resin wetting.

When the thermoset resin flow modelling module 116 determines, based on the second thermoset resin flow model, that the second PCB lamination process is not expected to result in adequate resin wetting, the second set of PCB lamination parameters 156 may be stored (e.g., at the memory 114). In the particular embodiment illustrated in FIG. 1, the PCB lamination process control module 118 may send second instructions 160 to the PCB lamination device 108. The second instructions 160 may include the second set of PCB lamination parameters 156, and the PCB lamination device 108 may perform one or more operations associated with forming the PCB laminate 146 according to the second set of PCB lamination parameters 156.

Figure 3:
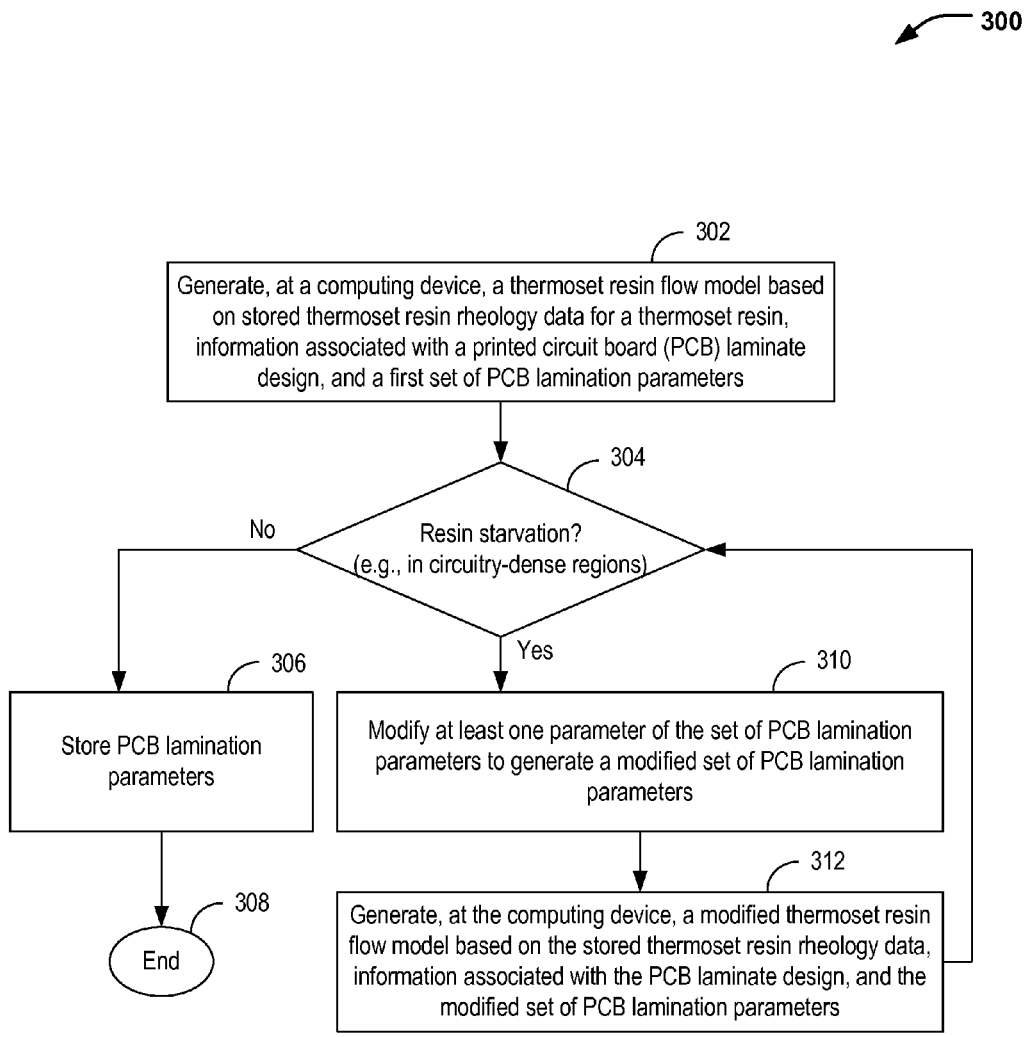
FIG. 3 is a flow diagram showing a particular embodiment of a method of utilizing a thermoset resin flow model and (iteratively) adjusting PCB lamination parameter(s)

As described further herein with respect to FIG. 3, when the thermoset resin flow modelling module 116 determines, based on the second thermoset resin flow model, that the second PCB lamination process is expected to result in inadequate resin wetting, at least one parameter of the second set of PCB lamination parameters 156 may be modified to generate a modified set of PCB lamination parameters (not shown in FIG. 1). For example, the modified set of PCB lamination parameters may include modified temperature(s), modified pressure(s), modified rate(s) of temperature change, or a combination thereof. The thermoset resin flow modelling module 116 may retrieve thermoset resin fluid flow data (e.g., a third set of dynamic fluid flow properties, such as dynamic viscosity values) from the stored thermoset resin rheology data 104 that corresponds to the modified set of PCB lamination parameters. The thermoset resin flow modelling module 116 may generate a modified thermoset resin flow model based on the retrieved thermoset resin fluid flow data, the information associated with the PCB laminate design (e.g., the multiple-layer stackup 130), and the modified set of PCB lamination parameters.

As described further herein with respect to FIG. 3, the PCB lamination parameters may be (iteratively) adjusted until the thermoset resin flow modelling module 116 determines that a particular set of PCB lamination parameters is not expected to result in inadequate resin wetting. Upon determining that adequate resin wetting is expected, the PCB lamination process control module 118 may send instructions to the PCB lamination device 108. The instructions may include the modified set of PCB lamination parameters, and the PCB lamination device 108 may perform one or more operations associated with forming the PCB laminate 146 according to the modified set of PCB lamination parameters.

FIG. 1 further illustrates that, in some cases, formation of the PCB laminate 146 according to a particular set of PCB lamination parameters (e.g., the first set of PCB lamination parameters 150) may result in resin starvation. For example, the thermoset resin fill evaluation device 110 may be utilized to determine that the PCB laminate 146 includes one or more regions of resin starvation. As another example, the thermoset resin fill evaluation device 110 may be utilized to determine that resin fill is too thin for desired properties (e.g., electrical or mechanical properties). In the example of FIG. 1, the thermoset resin fill evaluation device 110 provides thermoset resin fill data 162 to the computing device 102. Alternatively, the user 120 may provide information to the computing device 102 to indicate that a PCB lamination process resulted in resin starvation.

In order to provide adequate resin to the identified resin-starved region(s), at least one PCB lamination parameter may be adjusted to generate a modified set of PCB lamination parameters (e.g., the second set of PCB lamination parameters 156). In some cases, the user 120 may determine the parameter(s) to be modified. In other cases, the thermoset resin flow modelling module 116 may automatically identify the parameter(s) to be modified. After modification of the PCB lamination parameter(s), the PCB lamination process control module 118 may send modified instructions (e.g., the second instructions 160) to the PCB lamination device 108. The PCB lamination device 108 may perform operation(s) associated with forming a second printed circuit board according to the second set of PCB lamination parameters 156.

As resin starvation may not have been predicted by the thermoset resin flow modelling module 116, the thermoset resin fill data 162 may be utilized to more accurately simulate thermoset resin flow and/or to provide an indication that a PCB laminate design modification may be advantageous. As an illustrative, non-limiting example, the PCB laminate design may be modified to utilize a different thermoset material (e.g., a different prepreg material with an increased amount of resin content) between one or more layers of the multiple-layer stackup 130 in order to increase fluid flow to the identified resin-starved regions. To illustrate, the B-stage prepreg fiberglass material associated with the second layer 134 and/or the sixth layer 142 may correspond to a prepreg material with a first resin content (e.g., about 67 percent resin content for a pre-impregnated glass cloth). Selecting a different B-stage prepreg material with a second resin content (e.g., about 75 percent resin content for the pre-impregnated glass cloth) for one or more of the layers 134 and 142 may increase the resin flow to the identified resin-starved regions.

In some cases, formation of the PCB laminate 146 according to a particular set of PCB lamination parameters (e.g., the first set of PCB lamination parameters 150) results in a dielectric thickness between adjacent layers of the PCB laminate 146 that does not satisfy a dielectric thickness threshold (e.g., "too thick" of a dielectric layer or "too thin" of a dielectric layer). To illustrate, the B-stage prepreg fiberglass material of the second layer 134 and the B-stage prepreg fiberglass material of the sixth layer 142 form dielectric layers after curing. As an example, a thickness of the dielectric layer corresponding to the second layer 134 and/or the dielectric layer corresponding to the sixth layer 142 may be considered inadequate for coverage of a copper layer (e.g., the third layer 136 and/or the fifth layer 140). To illustrate, a measured dielectric thickness may be about 0.1 mm, and a dielectric thickness threshold for coating of copper lines may be about 0.2 mm. In order to adjust the dielectric thickness, at least one PCB lamination parameter may be adjusted to generate a modified set of PCB lamination parameters (e.g., the second set of PCB lamination parameters 156). After modification of the PCB lamination parameter(s), the PCB lamination process control module 118 may send modified instructions (e.g., the second instructions 160) to the PCB lamination device 108. The PCB lamination device 108 may perform operation(s) associated with forming a second printed circuit board according to the second set of PCB lamination parameters 156.

Thus, FIG. 1 illustrates that stored thermoset resin rheology data may be utilized to generate a thermoset resin flow model for a particular PCB laminate design and a particular set of PCB lamination parameters. The thermoset resin flow model may be utilized to determine whether adequate resin wetting is expected for a PCB lamination process that is based on the particular set of PCB lamination parameters. When inadequate resin wetting is expected and/or when inadequate resin wetting is detected (e.g., based on visual inspection of a laminated PCB), at least one PCB lamination parameter (or prepreg resin content) may be adjusted in order to provide adequate fluid flow to one or more resin-starved regions, in order to reduce a likelihood of failures (e.g., glistening filaments and/or cathodic anodic filaments) associated with resin starvation.

Figure 2:
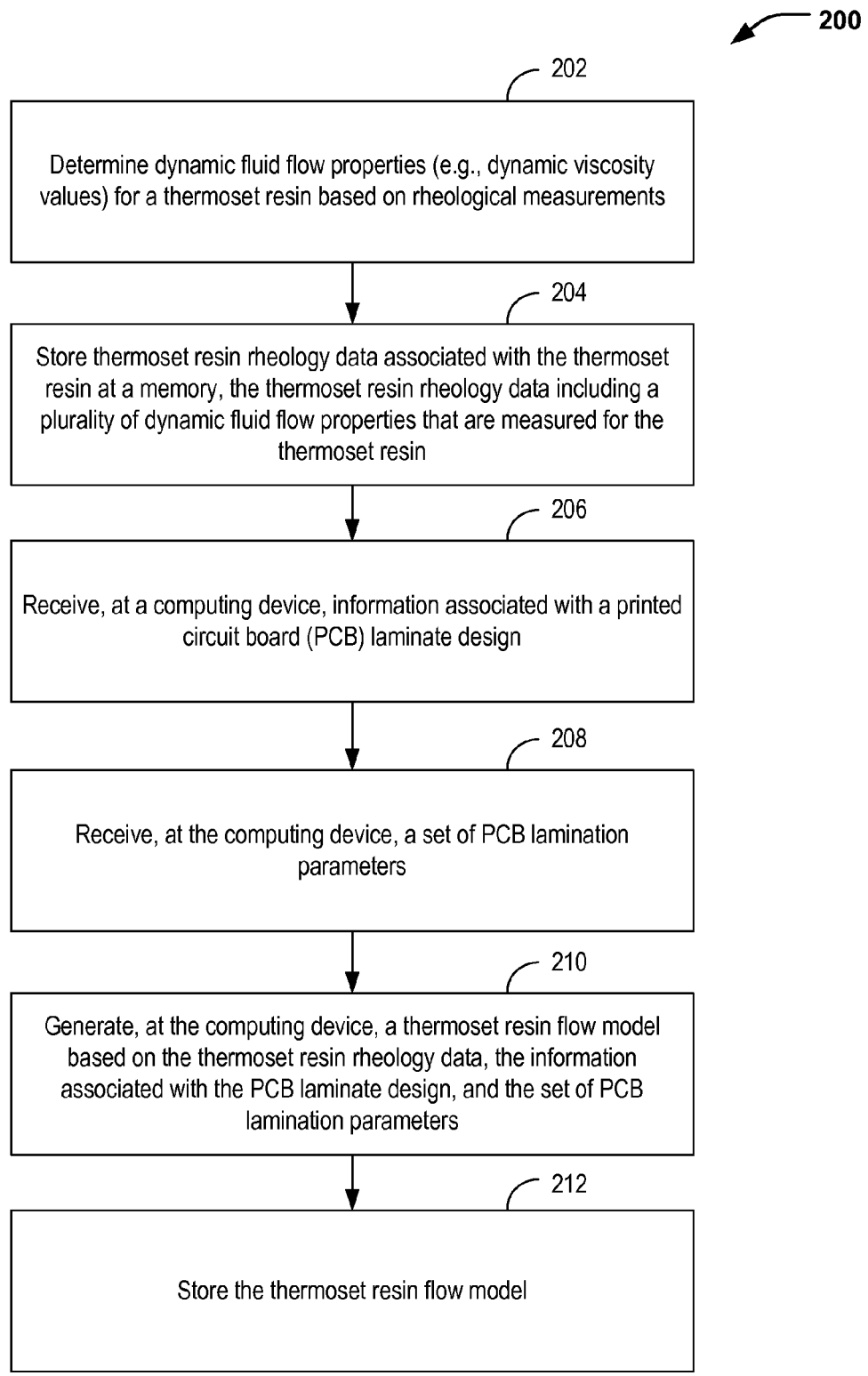
FIG. 2 is a flow diagram showing a particular embodiment of a method of generating a thermoset resin flow model based on thermoset resin rheology data, information associated with a PCB laminate design, and a set of PCB lamination parameters.

FIG. 2 illustrates a particular embodiment of a method 200 of generating a thermoset resin flow model based on thermoset resin rheology data, information associated with a PCB laminate design, and a set of PCB lamination parameters. As described further herein, the thermoset resin flow model may be utilized to determine whether resin starvation is expected to occur.

In the particular embodiment illustrated in FIG. 2, the method 200 includes determining dynamic fluid flow properties for a thermoset resin (e.g., dynamic viscosity values for the thermoset resin) based on rheological measurements, at 202. Rheological experiments may be performed in order to determine the dynamic fluid flow properties for the thermoset resin for various process conditions (e.g., temperature(s), time(s) at particular temperature(s), temperature ramp rate(s), pressure(s), etc.). For example, referring to FIG. 1, rheological experiments may be performed for the B-stage prepreg fiberglass material associated with the second layer 134 of the multiple-layer stackup 130. As another example, the B-stage prepreg fiberglass materials may have different resin contents, and rheological experiments may be performed for the different B-stage prepreg fiberglass materials (e.g., the prepreg fiberglass material associated with the sixth layer 142 of the multiple-layer stackup 130).

To illustrate, rheological experiments may be performed in order to determine dynamic viscosity values as a function of temperature and reaction state. A PCB lamination process may include multiple process stages, and the rheological experiments may be designed to simulate the process conditions throughout the different stages. As an example, a PCB lamination process may include multiple processing stages, each processing stage may be associated with different process conditions (e.g., a temperature, a time at the temperature, a pressure, etc.), and rates of change (e.g., temperature ramp rates) may be associated with transitioning between the different stages. Due to the complex nature of thermoset resin fluid flow properties, the rheological measurements may be designed to measure dynamic fluid flow properties (e.g., dynamic viscosity values) for a thermoset resin when exposed to various sets of processing conditions.

The method 200 includes storing thermoset resin rheology data associated with the thermoset resin at a memory, at 204. The thermoset resin rheology data includes a plurality of dynamic fluid flow properties that are measured for the thermoset resin. For example, referring to FIG. 1, the thermoset resin rheology data 104 may be stored at a memory (e.g., at a thermoset resin rheology database). While FIG. 1 illustrates the thermoset resin rheology data 104 being stored separately from the computing device 102, in other cases the thermoset resin rheology data 104 may be stored at the memory 114 of the computing device 102.

At 206, the method 200 includes receiving information associated with a PCB laminate design at a computing device. For example, referring to FIG. 1, the computing device 102 may receive information associated with the multiple-layer stackup 130 that may be stored as the PCB design information 106. As illustrated in the example of FIG. 1, the multiple-layer stackup 130 includes multiple layers associated with a thermoset resin (e.g., the B-stage prepreg fiberglass material of the second layer 134 and the B-stage prepreg fiberglass material of the sixth layer 142).

At 208, the method 200 includes receiving a set of PCB lamination parameters at the computing device. For example, referring to FIG. 1, the computing device 102 may receive the first set of PCB lamination parameters 150. As described further herein, the first set of PCB lamination parameters 150 may be associated with a PCB lamination process that includes a plurality of process stages, with different process conditions associated with the individual process stages.

At 210, the method 200 includes generating a thermoset resin flow model at the computing device. The thermoset resin flow model is generated based on the thermoset resin rheology data, the information associated with the PCB laminate design, and the set of PCB lamination parameters. For example, referring to FIG. 1, the thermoset resin flow modelling module 116 stored at the memory 114 of the computing device 102 may generate a (first) thermoset resin flow model based on the first thermoset resin rheology data 152, the information associated with the multiple-layer stackup 130, and the first set of PCB lamination parameters 150.

The method 200 includes storing the thermoset resin flow model, at 212. For example, referring to FIG. 1, the thermoset resin flow model may be stored at the memory 114 of the computing device 102.

Thus, FIG. 2 illustrates an example of a method of generating a thermoset resin flow model based on thermoset resin rheology data, information associated with a PCB laminate design, and a set of PCB lamination parameters. As described further herein, the thermoset resin flow model may be utilized to determine whether adequate resin wetting is expected to occur for particular process conditions. The stored thermoset resin rheological data may be used to generate modified thermoset resin flow model(s) to determine a particular set of PCB lamination parameters that provides adequate resin flow.

FIG. 3 illustrates a particular embodiment of a method 300 of utilizing a thermoset resin flow model to determine whether adequate resin wetting is expected for a particular set of PCB lamination parameters. In the particular embodiment illustrated in FIG. 3, the method 300 further includes (iteratively) adjusting PCB lamination parameter(s) until adequate resin wetting is expected (or is identified based on visual inspection of a laminated PCB).

The method 300 includes generating a thermoset resin flow model at a computing device, at 302. The thermoset resin flow model is generated based on stored thermoset resin rheology data, information associated with a PCB laminate design, and a first set of PCB lamination parameters. For example, referring to FIG. 1, the thermoset resin flow modelling module 116 may generate a thermoset resin flow model based on the stored thermoset resin rheology data 104, information associated with the multiple-layer stackup 130, and the first set of PCB lamination parameters 150.

The method 300 includes determining whether the first set of PCB lamination parameters is expected to result in resin starvation (or resin thickness that is too thin, resin thickness that is too thick, etc.), at 304. For example, referring to FIG. 1, the thermoset resin flow modelling module 116 may determine whether the first set of PCB lamination parameters 150 is expected to result in resin starvation.

In response to determining that the first set of PCB lamination parameters is not expected to result in resin starvation, the method 300 includes storing the first set of PCB lamination parameters, at 306. The method may end, at 308. For example, referring to FIG. 1, in the event that the thermoset resin flow modelling module 116 determines that the first set of PCB lamination parameters 150 is not expected to result in resin starvation, the first set of PCB lamination parameters 150 may be stored at the memory 114. In a particular embodiment, as described further herein with respect to FIG. 1, the PCB lamination process control module 118 may send the first instructions 154 to the PCB lamination device 108, and the PCB lamination device 108 may perform operation(s) associated with forming the PCB laminate 146 according to the first set of PCB lamination parameters 150.

In response to determining that the first set of PCB lamination parameters is expected to result in resin starvation, the method 300 includes modifying at least one parameter of the (first) set of PCB lamination parameters to generate a modified set of PCB lamination parameters, at 310. Method 300 further includes generating, at the computing device, a modified thermoset resin flow model based on the stated thermoset rheology resin data, information associated with the PCB lamination design, and the modified set of PCB lamination parameters, at 312. For example, referring to FIG. 1, the thermoset resin modelling module 116 may determine that the first set of PCB lamination parameters 150 is expected to result in resin starvation. In this case, the thermoset resin flow modelling module 116 may generate (or the user 120 may provide) a modified set of PCB lamination parameters (e.g., the second set of PCB lamination parameters 156).

After modifying the PCB lamination process parameter(s), the method 300 returns to 304 to determine whether the modified set of PCB lamination parameters is expected to result in resin starvation. FIG. 3 illustrates that, in some cases, the method 300 may include iteratively adjusting one or more PCB lamination parameters in order to determine a particular set of PCB lamination parameters that is not expected to result in resin starvation. The particular set of PCB lamination parameters may be stored, as shown at 306, and the method 300 may end, as shown at 308.

Thus, FIG. 3 illustrates an example of a method of utilizing a thermoset resin flow model to determine whether a particular set of PCB lamination parameters is expected to result in resin starvation. When resin starvation is expected, the PCB lamination parameter(s) may be adjusted. Based on stored thermoset resin rheology data, a modified thermoset resin flow model may be generated for the adjusted PCB lamination parameter(s) in order to determine whether resin starvation is expected. The PCB lamination parameter(s) may be iteratively adjusted until a thermoset resin flow model determines that resin starvation is not expected for a particular set of PCB lamination parameters. The identified PCB lamination parameters may be stored and (optionally) utilized to control a PCB lamination device.

Figure 4:
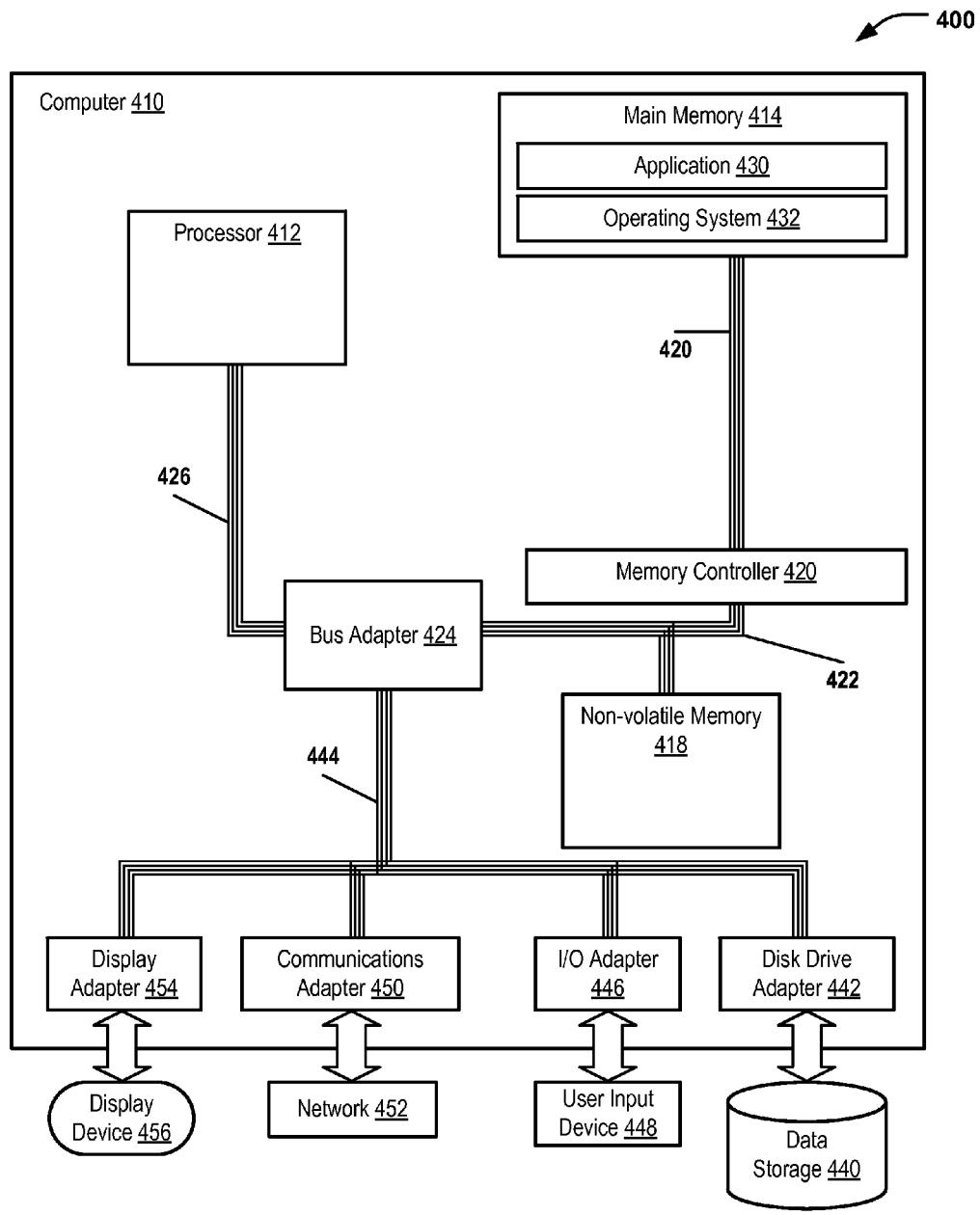
FIG. 4 is a block diagram of an exemplary computer system operable to support embodiments of computer-implemented methods, computer program products, and system components as illustrated in FIGS. 1-3.

Referring to FIG. 4, an exemplary automated computing machinery including a computer 410 is shown. The computer 410 is an exemplary implementation of the computing device 102 of FIG. 1. The computer 410 includes at least one computer processor (CPU) 412 as well as main memory 414, a memory controller 416, and a non-volatile memory 418. The main memory 414 is connected through a memory bus 420 to the memory controller 416. The memory controller 416 and the non-volatile memory 414 are connected through a memory bus 422 and a bus adapter 424 to the processor 412 through a processor bus 426.

Stored at the memory 414 is an application 430 that may be a module of user-level computer program instructions for carrying out particular tasks (e.g., the operations described with respect to the thermoset resin flow modelling module 116 and the PCB lamination process module 118 of FIG. 1, etc.). Also stored at the main memory 414 is an operating system 432. Operating systems include, but are not limited to, UNIX® (a registered trademark of The Open Group), Linux® (a registered trademark of Linus Torvalds), Windows® (a registered trademark of Microsoft Corporation, Redmond, Wash., United States), AIX® (a registered trademark of International Business Machines (IBM) Corp., Armonk, N.Y., United States) i5/OS® (a registered trademark of IBM Corp.), and others as will occur to those of skill in the art. The operating system 432 and the application 430 in the example of FIG. 4 are shown in the main memory 414, but components of the aforementioned software may also, or in addition, be stored at non-volatile memory (e.g., on data storage, such as illustrative data storage 440 and/or the non-volatile memory 418).

The computer 410 includes a disk drive adapter 442 coupled through an expansion bus 444 and the bus adapter 424 to the processor 412 and other components of the computer 410. The disk drive adapter 442 connects non-volatile data storage to the computer 410 in the form of the data storage 440 and may be implemented, for example, using Integrated Drive Electronics ("IDE") adapters, Small Computer System Interface ("SCSI") adapters, Serial Attached SCSI ("SAS") adapters, and others as will occur to those of skill in the art. Non-volatile computer memory also may be implemented as an optical disk drive, electrically erasable programmable read-only memory (so-called "EEPROM" or "Flash" memory), RAM drives, and other devices, as will occur to those of skill in the art. In a particular embodiment, the data storage 440 may store the thermoset resin rheology data 104 and/or the PCB design information 106 of FIG. 1.

The computer 410 also includes one or more input/output ("I/O") adapters 446 that implement user-oriented input/output through, for example, software drivers and computer hardware for controlling input and output to and from user input devices 448, such as keyboards and mice. In addition, the computer 410 includes a communications adapter 450 for data communications with a data communications network 452. In a particular embodiment, the communications adapter 450 may be utilized by the computing device 102 of FIG. 1 to communicate with the PCB lamination device(s) 108 and/or the thermoset resin fill evaluation device(s) 110. As an example, the communications adapter 452 may be utilized by the computing device 102 of FIG. 1 to send the first instructions 154 and/or the second instructions 160 to the PCB lamination device(s) 108. As another example, the communications adapter 452 may be utilized by the computing device 102 of FIG. 1 to receive the thermoset resin fill data 162 from the thermoset resin fill evaluation device(s) 110.

The data communications may be carried out serially through Recommended Standard 232 (RS-232) connections (sometimes referred to as "serial" connections), through external buses such as a Universal Serial Bus ("USB"), through data communications networks such as internet protocol (IP) data communications networks, and in other ways as will occur to those of skill in the art. The communications adapter 450 implements the hardware level of data communications through which one computer sends data communications to another computer, directly or through a data communications network. Examples of the communications adapter 450 suitable to use in the computer 410 include, but are not limited to, modems for wired dial-up communications, Ethernet (Institute of Electrical and Electronics Engineers (IEEE) 802.3) adapters for wired network communications, and IEEE 802.11 adapters for wireless network communications. The computer 410 also includes a display adapter 454 that facilitates data communication between the bus adapter 424 and a display device 456, enabling the application 430 to visually present output on the display device 456.

Particular embodiments described herein may take the form of an entirely hardware embodiment, an entirely software embodiment, or an embodiment containing both hardware and software elements. In a particular embodiment, the disclosed methods are implemented in software that is embedded in processor readable storage medium and executed by a processor that includes but is not limited to firmware, resident software, microcode, etc.

Further, embodiments of the present disclosure, may take the form of a computer program product accessible from a computer-usable or computer-readable storage medium providing program code for use by or in connection with a computer or any instruction execution system. For the purposes of this description, a computer-usable or computer-readable storage medium can be any apparatus that can tangibly embody a computer program and that can contain, store, communicate, propagate, or transport the program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories that may provide temporary or more permanent storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A method comprising:
   storing thermoset resin rheology data at a memory, the thermoset resin rheology data including a plurality of dynamic fluid flow properties that are measured for a thermoset resin;
   receiving, at a computing device, information associated with a printed circuit board (PCB) laminate design;
   receiving, at the computing device, a first set of PCB lamination parameters;
   storing, at the computing device, a first thermoset resin flow model that is generated based on the thermoset resin rheology data, the information associated with the PCB laminate design, and the first set of PCB lamination parameters;
   sending first instructions to a PCB lamination device; and
   forming a first printed circuit board laminate according to the first set of PCB lamination parameters.

2. The method of claim 1, further comprising determining, based on the first thermoset resin flow model, whether a first PCB lamination process that is based on the first set of PCB lamination parameters is expected to result in resin starvation.

3. The method of claim 2, further comprising, in response to determining that the first PCB lamination process is expected to result in resin starvation, modifying at least one parameter of the first set of PCB lamination parameters to generate a second set of PCB lamination parameters.

4. The method of claim 3, wherein modifying the at least one parameter includes modifying a temperature, a pressure, a rate of temperature change, or a combination thereof.

5. The method of claim 3, wherein the thermoset resin rheology data includes:
   a first set of dynamic fluid flow properties for the thermoset resin, the first set of dynamic fluid flow properties corresponding to the first set of PCB lamination parameters; and
   a second set of dynamic fluid flow properties for the thermoset resin, the second set of dynamic fluid flow properties corresponding to the second set of PCB lamination parameters.

6. The method of claim 3, further comprising:
   generating a second thermoset resin flow model based on the thermoset resin rheology data, the information associated with the PCB laminate design, and the second set of PCB lamination parameters; and
   determining, based on the second thermoset resin flow model, whether a second PCB lamination process that is based on the second set of PCB lamination parameters is expected to result in resin starvation.

7. The method of claim 6, further comprising storing, at the computing device, the second set of PCB lamination parameters responsive to determining that the second PCB lamination process is not expected to result in resin starvation.

8. The method of claim 1, further comprising:
   determining that formation of the first printed circuit board laminate according to the first set of PCB lamination parameters results in resin starvation;
   modifying at least one parameter of the first set of PCB lamination parameters to generate a second set of PCB lamination parameters;
   sending second instructions to the PCB lamination device; and
   forming a second printed circuit board laminate according to the second set of PCB lamination parameters.

9. The method of claim 1, further comprising:
   determining that formation of the first printed circuit board laminate according to the first set of PCB lamination parameters results in a dielectric thickness between adjacent layers of the first printed circuit board laminate that does not satisfy a dielectric thickness threshold;
   modifying at least one parameter of the first set of PCB lamination parameters to generate a second set of PCB lamination parameters; and
   sending second instructions to the PCB lamination device to form a second printed circuit board according to the second set of PCB lamination parameters.

10. The method of claim 1, wherein:
   the first set of PCB lamination parameters is associated with a PCB lamination process that includes a plurality of process stages, the plurality of process stages including at least a first process stage and a second process stage;
   the first process stage corresponds to a first set of process conditions;
   the second process stage corresponds to a second set of process conditions that is different from the first set of process conditions; and
   the thermoset resin rheology data that is stored at the memory includes a first set of dynamic fluid flow properties for the thermoset resin, wherein the first set of dynamic fluid flow properties are determined by monitoring fluid flow properties of the thermoset resin during application of the first set of process conditions during a first time period and the second set of process conditions during a second time period.

11. The method of claim 10, wherein the first set of dynamic fluid flow properties includes dynamic viscosity values for the thermoset resin as a function of temperature and reaction state, and wherein the dynamic viscosity values are measured for the thermoset resin during the first time period and the second time period.

12. The method of claim 10, wherein the first set of process conditions includes a first temperature and a first pressure, and wherein the second set of process conditions includes a second temperature and a second pressure.

13. The method of claim 12, wherein the first temperature is different from the second temperature.

14. The method of claim 12, wherein the first pressure is different from the second pressure.

15. A non-transitory computer-readable storage device comprising instructions executable by a processor to perform operations including:
receiving information associated with a printed circuit board (PCB) laminate design that includes multiple layers associated with a thermoset resin;
receiving a first set of PCB lamination parameters;
retrieving first stored thermoset resin rheology data including a first set of dynamic fluid flow properties for the thermoset resin;
generating a first thermoset resin flow model based on the first set of dynamic fluid flow properties for the thermoset resin, the information associated with the PCB laminate design, and the first set of PCB lamination parameters;
sending instructions to a PCB lamination device; and
forming a printed circuit board according to the first set of PCB lamination parameters.

16. The non-transitory computer-readable storage device of claim 15, the operations further comprising:
determining that formation of the printed circuit board according to the first set of PCB lamination parameters results in resin starvation; and
modifying the PCB laminate design by selecting a thermoset material with an increased thermoset resin content to replace at least one layer of the multiple layers associated with the thermoset resin.

17. The non-transitory computer-readable storage device of claim 15, the operations further comprising:
determining, based on the first thermoset resin flow model, that a first PCB lamination process that is based on the first set of PCB lamination parameters is expected to result in resin starvation;
modifying at least one parameter of the first set of PCB lamination parameters to generate a second set of PCB lamination parameters;
retrieving second stored thermoset resin rheology data including a second set of dynamic fluid flow properties for the thermoset resin; and
generating a second thermoset resin flow model based on the second set of dynamic fluid flow properties for the thermoset resin, the information associated with the PCB laminate design, and the second set of PCB lamination parameters.

18. A system comprising:
a processor;
a memory in communication with the processor, the memory including instructions executable by the processor to perform operations including:
receiving information associated with a printed circuit board (PCB) laminate design that includes multiple layers associated with a thermoset resin;
receiving a set of PCB lamination parameters;
retrieving stored thermoset resin rheology data including a set of dynamic fluid flow properties for the thermoset resin;
generating a thermoset resin flow model based on the set of dynamic fluid flow properties for the thermoset resin, the information associated with the PCB laminate design, and the set of PCB lamination parameters;
sending instructions to a PCB lamination device; and
forming a printed circuit board according to the set of PCB lamination parameters.

19. The system of claim 18, wherein the operations further include:
determining that a PCB lamination process that is based on the set of PCB lamination parameters is not expected to result in resin starvation, underflow or excess thickness; and
storing, at the memory, the set of PCB lamination parameters.

* * * * *